United States Patent
Bogeskov-Jensen et al.

(10) Patent No.: US 6,760,458 B1
(45) Date of Patent: Jul. 6, 2004

(54) HEADSET AND METHOD OF MANUFACTURING HEADSETS THAT UTILIZE A SINGLE TRANSCEIVER FORM-FACTOR DESIGN WITH A NUMBER OF DIFFERENT HOUSING STYLES

(75) Inventors: Tom Bogeskov-Jensen, Stangerup (DK); Jan Larsen, Smoerum (DK)

(73) Assignee: GN Netcom, Inc., Ballerup (DK)

( * ) Notice: Subject to any disclaimer, the term of this patent is extended or adjusted under 35 U.S.C. 154(b) by 189 days.

(21) Appl. No.: 09/712,867

(22) Filed: Nov. 15, 2000

(51) Int. Cl.[7] .............................................. H04R 25/00
(52) U.S. Cl. ...................................... 381/370; 381/375
(58) Field of Search ................................ 381/370–383, 381/328, 329, 330; 379/430, 431, 433.02

(56) References Cited

U.S. PATENT DOCUMENTS

| | | | | |
|---|---|---|---|---|
| 3,826,987 A | * | 7/1974 | Stevens | 381/370 |
| 4,302,635 A | | 11/1981 | Jacobsen et al. | 179/156 R |
| 4,319,095 A | | 3/1982 | Cogan | 179/103 |
| 5,420,935 A | * | 5/1995 | Shinohara et al. | 381/370 |
| 5,581,627 A | | 12/1996 | Bowser et al. | 38/183 |
| 5,590,417 A | | 12/1996 | Rydbeck | 455/89 |
| 5,708,720 A | * | 1/1998 | Meyer | 381/322 |
| 5,960,094 A | * | 9/1999 | Jensen et al. | 381/381 |
| 6,084,976 A | * | 7/2000 | Lin | 381/380 |
| 6,373,942 B1 | * | 4/2002 | Braund | 379/430 |

FOREIGN PATENT DOCUMENTS

| | | | | |
|---|---|---|---|---|
| WO | WO 97/32423 | | 9/1997 | H04M/1/02 |
| WO | WO 00/11796 | | 3/2000 | H04B/1/38 |
| WO | WO 01/78354 | | 10/2001 | |

OTHER PUBLICATIONS

"International Search Report," mailed Apr. 17, 2002, in Appln. No. PCT/DK01/00754, filed Nov. 15, 2001, in the name of applicant GN Netcom A/S, et al., 6 pages in length.

* cited by examiner

*Primary Examiner*—Rexford Barnie
(74) *Attorney, Agent, or Firm*—Stallman & Pollock LLP (57) ABSTRACT

A headset and a method of manufacturing headsets are disclosed where a single transceiver form-factor design is utilized with a number of styles of housings. By utilizing the same transceiver with the different styles of housings, manufacturing costs are reduced while at the same time providing a wider variety of choices to the consumer.

24 Claims, 10 Drawing Sheets

HEADSET AND METHOD OF MANUFACTURING HEADSETS THAT UTILIZE A SINGLE TRANSCEIVER FORM-FACTOR DESIGN WITH A NUMBER OF DIFFERENT HOUSING STYLES

BACKGROUND OF THE INVENTION

1. Field of the Invention

The present invention relates to headsets and, more particularly, to a headset and method of manufacturing headsets that utilize a single transceiver form-factor design with a number of different housing styles.

2. Description of the Related Art

A headset is a device that, when worn by a user, positions a speaker next to the user's ear and a microphone next to the user's mouth. The headset, which allows hands-free operation, is commonly worn by telephone operators and is increasingly being worn by personal computer users for telephony over the internet, gaming, and speech recognition. In addition, more and more cell phone users are utilizing headsets.

Figure 1:
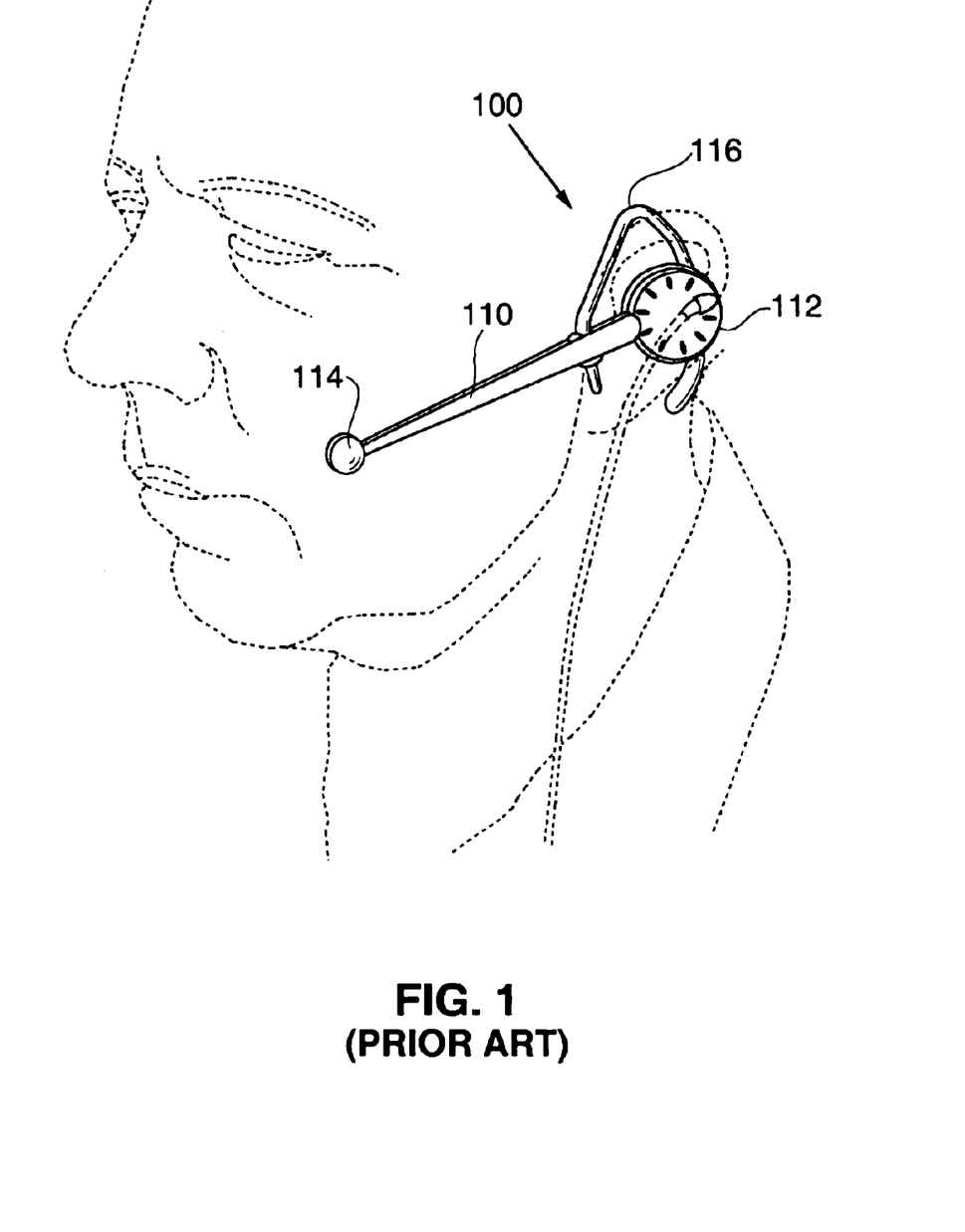
FIG. 1 is a perspective view illustrating a prior-art headset 100.

FIG. 1 shows a perspective view that illustrates a prior-art headset 100. As shown in FIG. 1, headset 100 has an elongated support member 110, a speaker 112 which is connected to one end of support member 110, and a microphone 114 which is connected to the opposite end of support member 110.

Further, headset 100 has a positioning member 116 that is connected to support member 110. Positioning member 116, which is designed to be worn over the ear, has a first section that is connected to member 110, a second angled section that is connected to the first section, and an arcuate-shaped third section that is connected to the second section.

In addition to the ear-type headset shown in FIG. 1, headsets are also commonly available that use a headband to hold the support member, and thereby the speaker and microphone, in place. With a headband support member, the speaker is placed over one ear with the headband extending over and contacting the head with a padded end that the rests above the opposite ear.

Another common type of headset, sometimes referred to as soap-on-a-rope, utilizes a speaker which is placed in or next to the ear, and a microphone which is located somewhere on the wire that connects the speaker to a telephone or computer. Although this soap-on-a-rope type headset is very compact and easy to transport, the location of the microphone, which is often clipped to the user's clothing, is susceptible to excessive background noise.

SUMMARY OF THE INVENTION

The present invention provides a method of manufacturing headsets that utilizes a single transceiver form-factor design with a number of housing styles. By utilizing a single transceiver form-factor with a number of housing styles, development costs, manufacturing costs, and time to market are reduced while at the same time providing a wider variety of choices to the consumer. In addition, after buying the first headset, the consumer can purchase additional housings without purchasing additional transceivers as the transceiver from the first headset can be used in whatever housing the consumer desires to wear.

The method of the present invention includes the step of forming a plurality of substantially identical transceivers. Each transceiver has a body, a speaker transducer connected to the body that outputs sound in response to a sound signal, and a microphone transducer connected to the body that outputs an electrical speech signal in response to input sound. The method also includes the step of forming a number of housings with different housing styles. The method further includes the step of attaching the substantially identical transceivers to the housings so that transceivers are attached to different housing styles. This, in turn, allows different headsets to be built with different outer shapes, all using the same transceiver design.

The method of the present invention may also include the steps of displaying the housing styles to a user population, and receiving an order from a user. The order identifies a style of housing selected by the user.

The method of the present invention produces a collection of headsets that include a number of first and second housings. The first and second housings each have an inner cavity. The collection of headsets also includes a number of substantially-identical transceivers. The transceivers are positioned within the inner cavity of each first housing and the inner cavity of each second housing.

A better understanding of the features and advantages of the present invention will be obtained by reference to the following detailed description and accompanying drawings that set forth an illustrative embodiment in which the principles of the invention are utilized.

DETAILED DESCRIPTION

Figure 2:
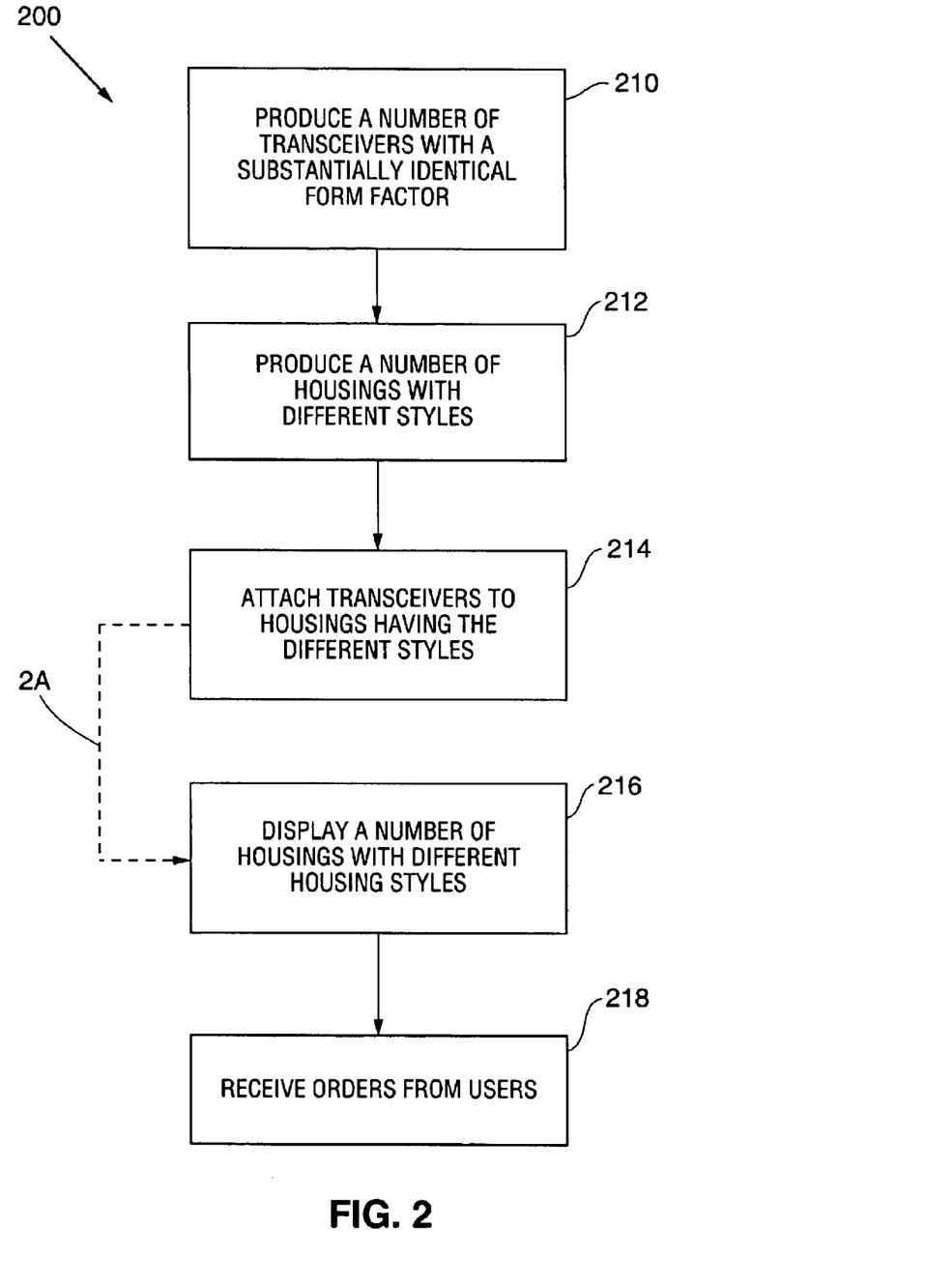
FIG. 2 is a flow chart illustrating a method 200 for manufacturing headsets in accordance with the present invention.

FIG. 2 shows a flow chart that illustrates a method 200 for manufacturing headsets in accordance with the present invention. As shown in FIG. 2, method 200 includes step 210 where a number of transceivers with an identical form factor are produced. (Transceivers that are intended to have the same form factor but have slight variations due to manufacturing tolerances are considered to be identical.)

Figure 3:
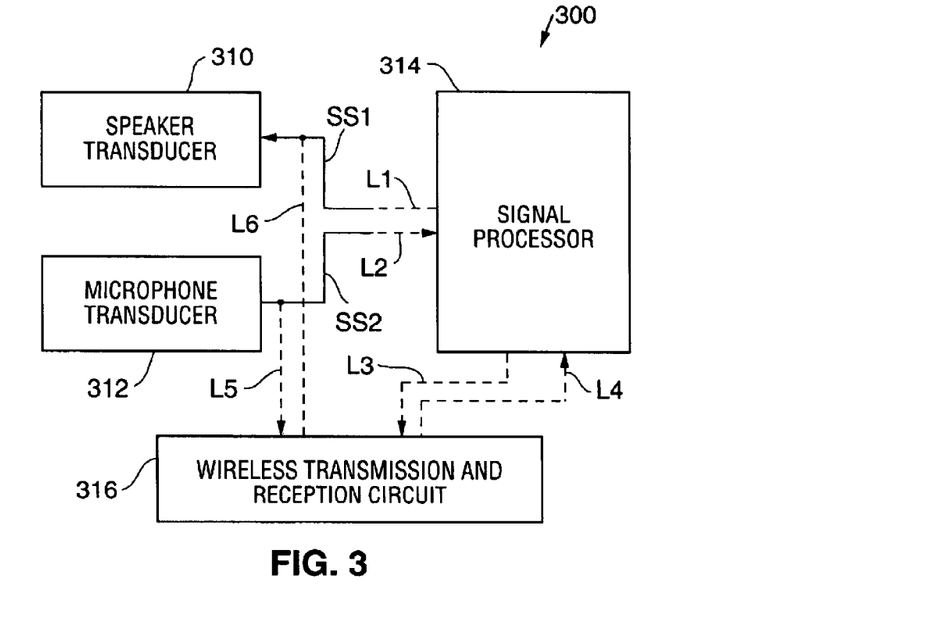
FIG. 3 is a block diagram illustrating a transceiver 300 in accordance with the present invention.

FIG. 3 shows a block diagram that illustrates a transceiver 300 in accordance with the present invention. As shown in FIG. 3, transceiver 300 includes a speaker transducer 310 that outputs sound in response to a received sound signal SS1, and a microphone transducer 312 that outputs an electrical speech signal SS2 in response to received (input) sound.

In addition, as shown by dashed lines L1 and L2, transceiver 300 can optionally include a signal-processing circuit 314 that is connected to the speaker and microphone transducers 310 and 312. Signal-processing circuit 314 can perform all or a portion of the signal processing that is required to interface transducers 310 and 312 with a communication device (not shown), such as a telephone or a computer. Signal processing circuit 314 can also perform other functions such as filtering, limiting, and echo canceling.

Further, as shown by dashed lines L3 and L4, transceiver 300 can optionally include a wireless transmission and reception circuit 316 that is connected to signal processing circuit 314. Wireless transmission and reception circuit 316 transmits processed or partially processed signals from signal processing circuit 314 to the communication device, and transmits compatible signals from the communication device to signal processing circuit 314, without the use of a connecting wire. In addition, as shown by dashed lines L5 and L6, speaker transducer 310 and microphone transducer 312 can optionally be connected directly to wireless transmission and reception circuit 316.

As noted above, the transceivers are produced to have a single form factor. Although the transceivers are produced to have a single form factor, the form factor can have any shape, such as an elongated shape, a circular shape, a square shape, or a flat laminated shape such as the shape of a shark's fin.

Figures 4A, 4B:
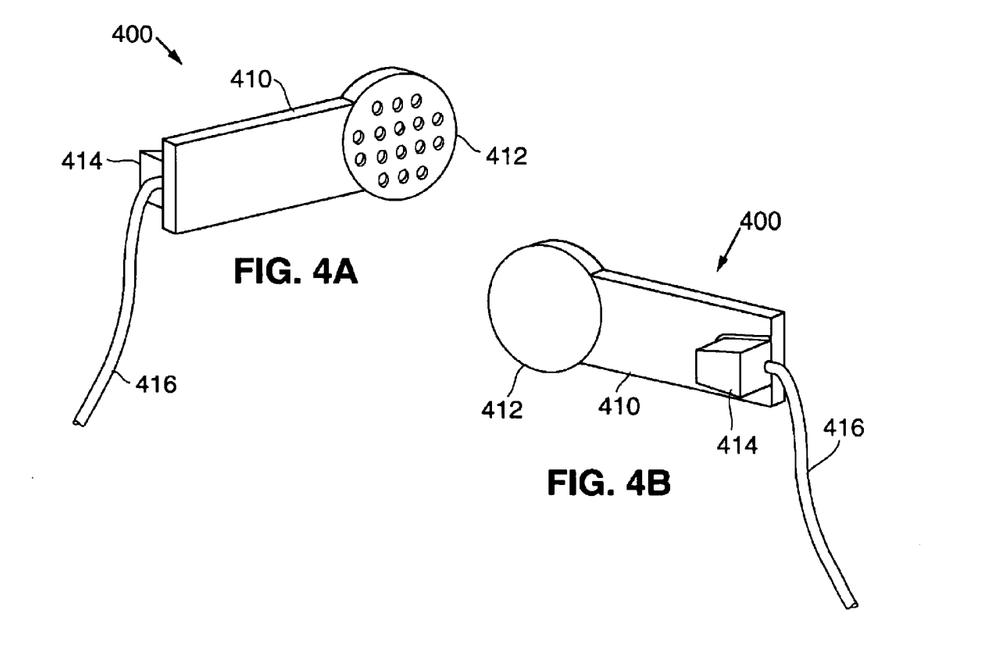
FIGS. 4A and 4B are opposing perspective views of a transceiver 400 illustrating a first example of a form factor in accordance with the present invention.

FIGS. 4A and 4B show opposing perspective views of a transceiver 400 that illustrates a first example of a form factor in accordance with the present invention. As shown in FIGS. 4A and 4B, transceiver 400 has an elongate body 410 with a first end and a second end. In addition, transceiver 400 also has a member 412, which accommodates a speaker transducer, that is connected to the first end of the elongate body, and a projection 414, which accommodates a microphone transducer, that is connected to the second end of elongate body 410.

Elongate body 410 of transceiver 400 can be flexible or rigid such that a position of the speaker transducer with respect to the microphone transducer is changeable or fixed, respectively. In addition, when the transceiver does not have a wireless transmission and reception circuit, an external wire 416 is connected to transceiver 400 to provide a connection to the communication device (not shown).

Figures 5A, 5B:
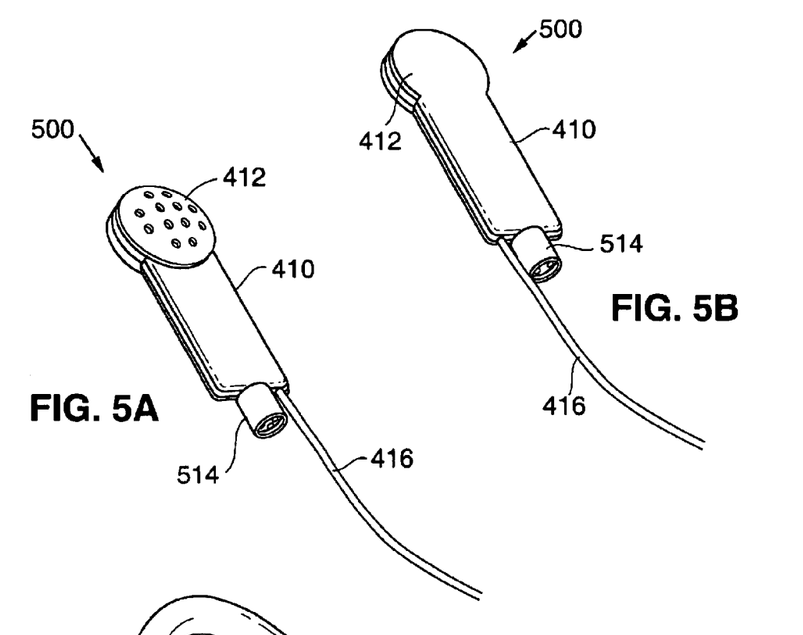
FIGS. 5A and 5B are opposing perspective views of a transceiver 500 illustrating a second example of a form factor in accordance with the present invention.

FIGS. 5A and 5B show opposing perspective views of a transceiver 500 that illustrates a second example of a form factor in accordance with the present invention. Transceiver 500 is similar to transceiver 400 and, as a result, utilizes the same reference numerals to designate the structures that are common to both transceivers.

As shown in FIGS. 5A and 5B, transceiver 500 differs from transceiver 400 in that transceiver 500 has a projection 514 that accommodates a microphone transducer. Unlike projection 414 that extends from the side of transceiver 400, projection 514 extends from the end of transceiver 500 along the longitudinal axis of transceiver 500.

In addition to the above, rather than using a number of transceivers with a single form factor, a number of receivers with the same form factor can alternately be used.

Returning to FIG. 2, method 200 also includes step 212 where a number of housings with different styles are produced. (Steps 210 and 212 can be performed in any order, or at the same time.) Although the housing styles are different, each housing is designed to operate with the transducer of the present invention.

Figure 6A:
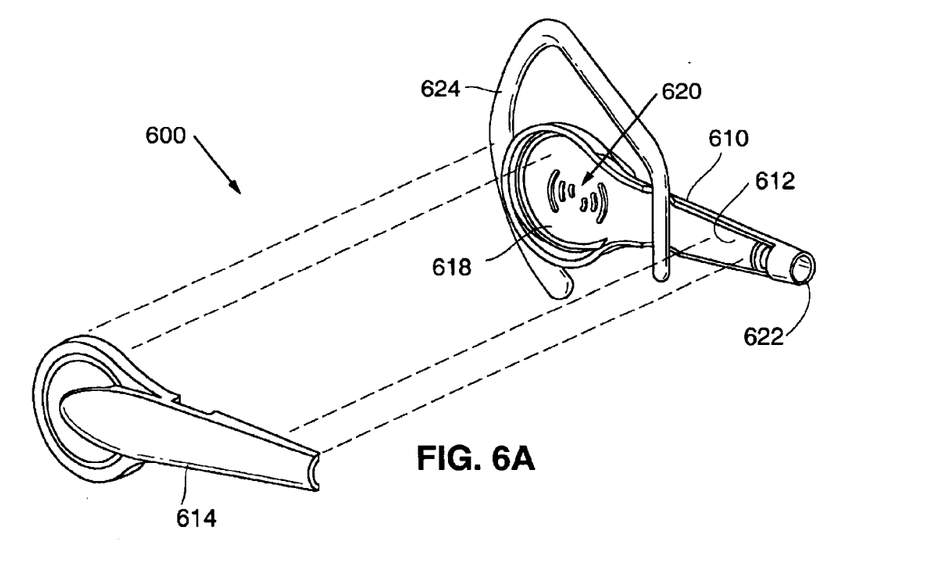
FIGS. 6A and 6B are perspective views of a housing 600 illustrating a first example of a housing style in accordance with the present invention.
Figure 6B:
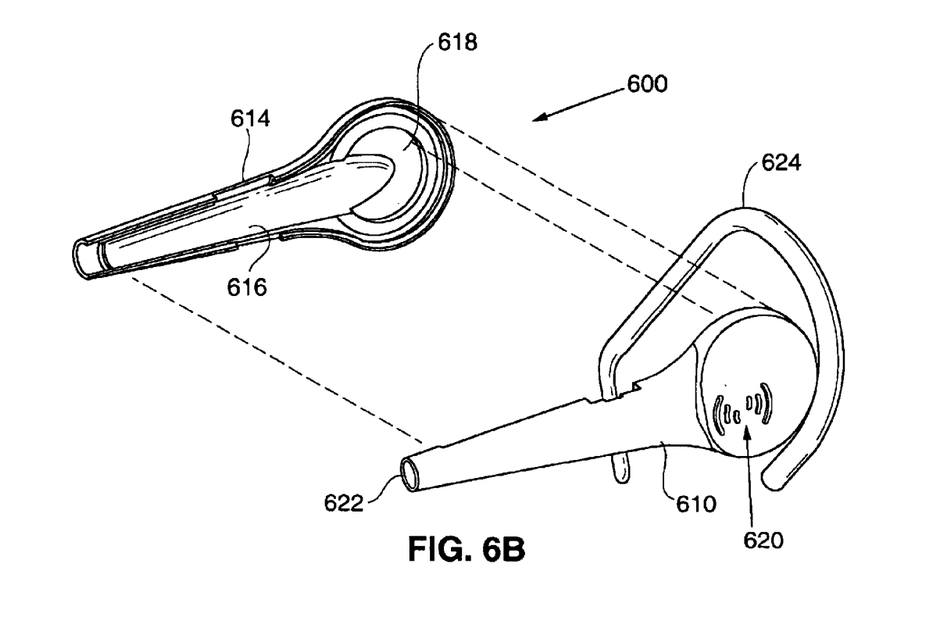

FIGS. 6A and 6B show opposing perspective views of a housing 600 that illustrates a first example of a housing style in accordance with the present invention. As shown in FIGS. 6A and 6B, housing 600 is a two-piece structure with a first half 610 that has an inner side 612 and a second half 614 that has an inner side 616.

When first and second halves 610 and 614 are connected together, housing 600 has an elongate body with a first end and a second end. In addition, inner sides 612 and 616 define an inner cavity 618 that has a number of openings 620 at the first end and an opening 622 at the second end.

Inner cavity 618 receives a transceiver, such as transceiver 400 or 500, while openings 620 allow sound from the speaker transducer to pass out to the external world. Opening 622, in turn, directs sounds to the microphone transducer of the transceiver. Further, any of a number of structures, such as ear piece 624, can be connected to housing 600 to position housing 600 next to the ear of a user.

Figure 7:
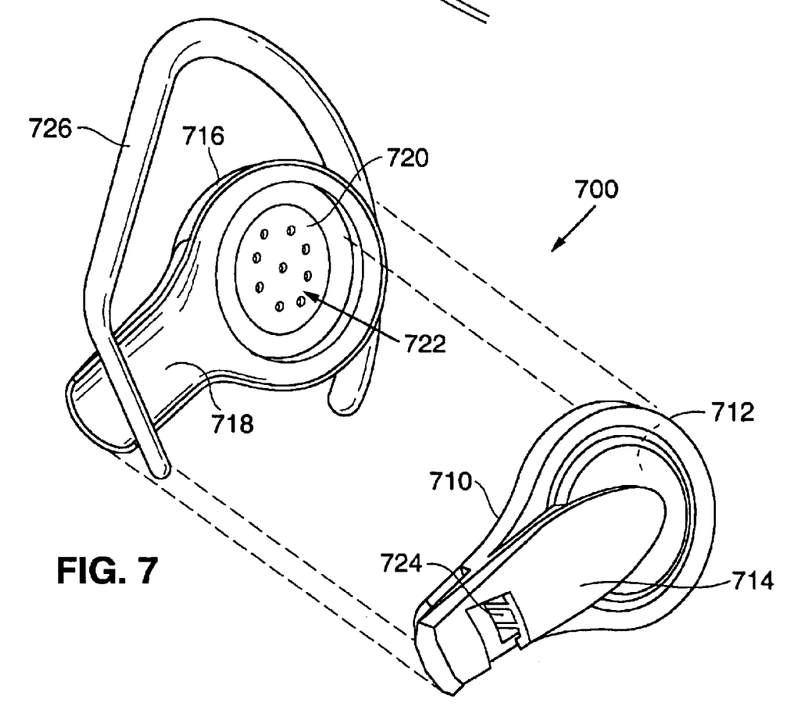
FIG. 7 is a perspective view of a housing 700 illustrating a second example of a housing style in accordance with the present invention.

FIG. 7 shows a perspective view of a housing 700 that illustrates a second example of a housing style in accordance with the present invention. As shown in FIG. 7, housing 700 is also a two-piece structure with a first half 710 that has an inner side 712 and an outer side 714, and a second half 716 that has an inner side 718.

When first and second halves 710 and 716 are connected together, housing 700 has an elongate body with a first end and a second end that is shorter than the elongate body of housing 600. In addition, inner sides 712 and 718 define an inner cavity 720 that has a number of openings 722 at the first end and an opening 724 in outer side 714 at the second end of first half 710.

Inner cavity 720 receives a transceiver, such as transceiver 400 or 500, while openings 722 allow sound from the speaker transducer to pass out to the external world. Opening 724, in turn, directs sounds to the microphone transducer of the transceiver. Further, any of a number of structures, such as ear piece 726, can be connected to housing 700 to position housing 700 next to the ear of a user.

Figures 8A, 8B:
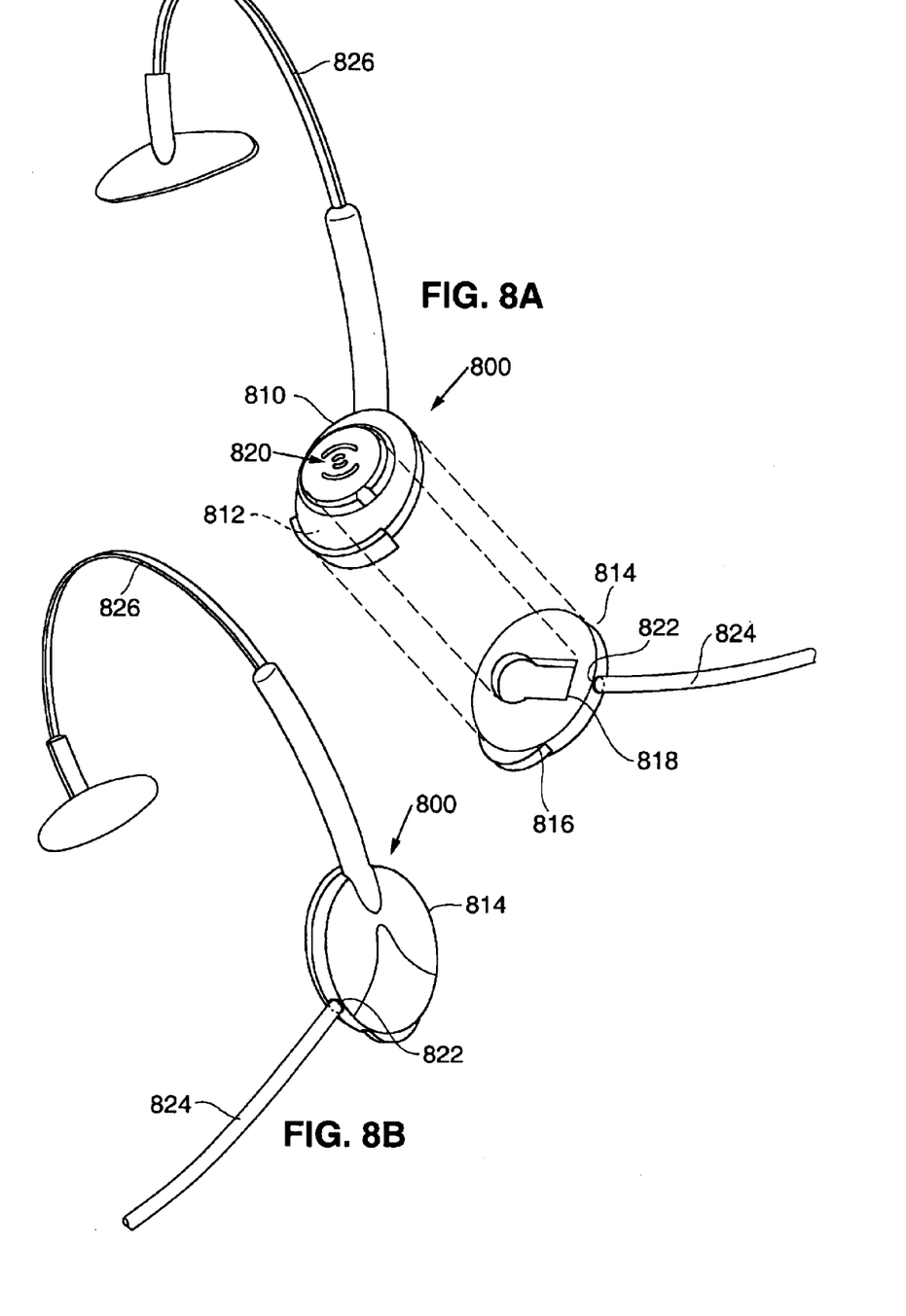
FIGS. 8A and 8B are perspective views of a housing 800 illustrating a third example of a housing style in accordance with the present invention.

FIGS. 8A and 8B show opposing perspective views of a housing 800 that illustrates a third example of a housing style in accordance with the present invention. As shown in FIGS. 8A and 8B, housing 800 is a two-piece structure with a first half 810 that has an inner side 812 and a second half 814 that has an inner side 816.

When first and second halves 810 and 814 are connected together, housing 800 has a circular body. In addition, inner sides 812 and 816 define an inner cavity 818 that has a number of openings 820 at the center of the body and an opening 822 in the side wall.

Inner cavity 818 receives a transceiver, such as transceiver 400 or 500, while openings 820 allow sound from the speaker transducer to pass out to the external world. Opening 822, in turn, directs sounds to the microphone transducer of the transceiver. In addition, housing 800 optionally includes a hollow sound conducting tube 824 that is connected to opening 822 to direct sounds to the microphone transducer. Optionally, sound conducting tube 824 can be directly connected to the transceiver. Further, any of a number of structures, such as head band 826, can be used to position housing 800 next to the ear of a user.

Figure 9:
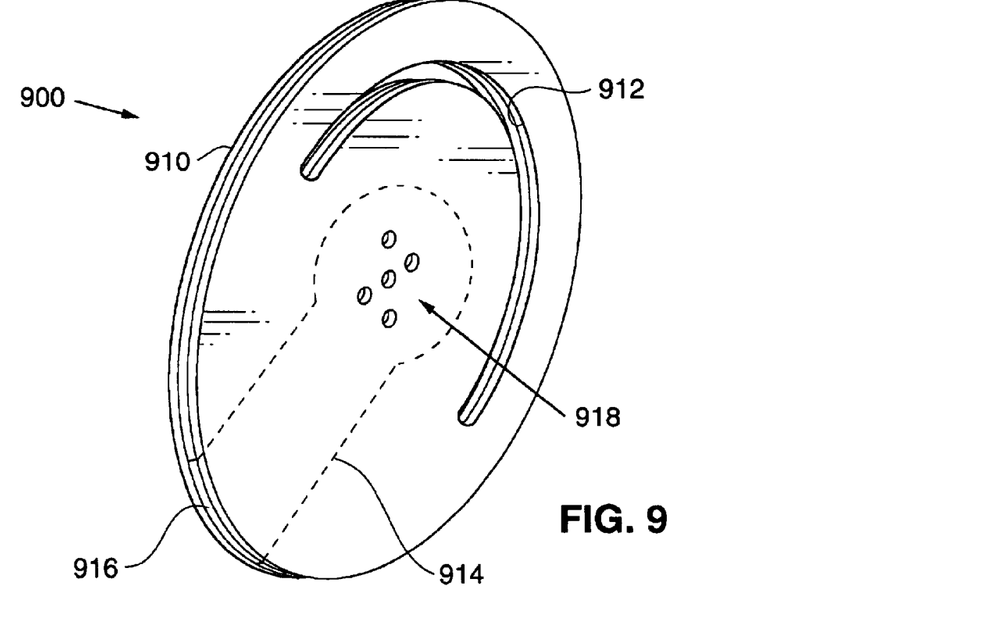
FIG. 9 is a perspective view of a housing 900 illustrating a fourth example of a housing style in accordance with the present invention.

FIG. 9 shows a perspective view of a housing 900 that illustrates a fourth example of a housing style in accordance with the present invention. As shown in FIG. 9, housing 900 has a flexible, multi-layer laminate body 910. In addition, housing 900 has a cutout 912, an inner cavity 914, a first opening 916, and a number of second openings 918. Cutout 912 allows housing 900 to be hung from the ear of a user, while inner cavity 914 receives a transceiver, such as transceiver 400 or 500. Further, first opening 916 exposes the microphone transducer of the transceiver to external sounds, while second openings 918 expose the speaker transducer to the external world.

Figure 10:
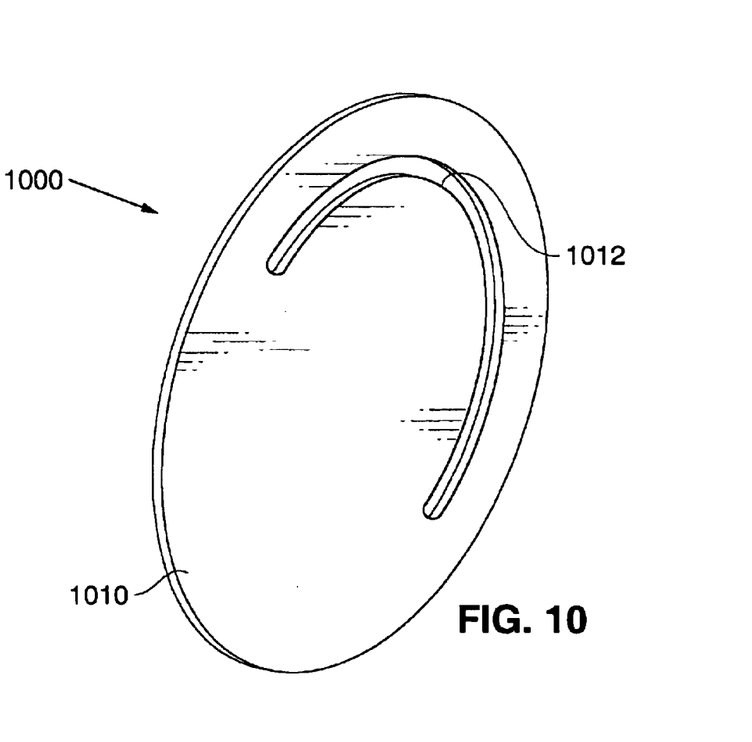
FIG. 10 is a perspective view of a housing 1000 illustrating a fifth example of a housing style in accordance with the present invention.

FIG. 10 shows a perspective view of a housing 1000 that illustrates a fifth example of a housing style in accordance with the present invention. As shown in FIG. 10, housing 1000 has a flexible, single-layer laminate body 1010 with a cutout 1012 that allows housing 1000 to be hung from the ear of a user.

Although five examples of housing styles have been discussed, the housings of the present invention are not limited to these five styles and may have, as noted above, any style. In addition, the housings can be partially or completely formed from a material that can be cut with a pair of scissors so that the user can cut the outer sides of the housing into whatever shape is desired. The material of the housings can include, for example, foamed plastic, thin films, fabrics, or rubber. When the material is penetratable, no sound holes are needed in the housings. Further, in addition to housings 900 and 1000, housings 600, 700, and 800 can also have a cut out that allows these housings to hang from the ear of a user.

Figure 11:
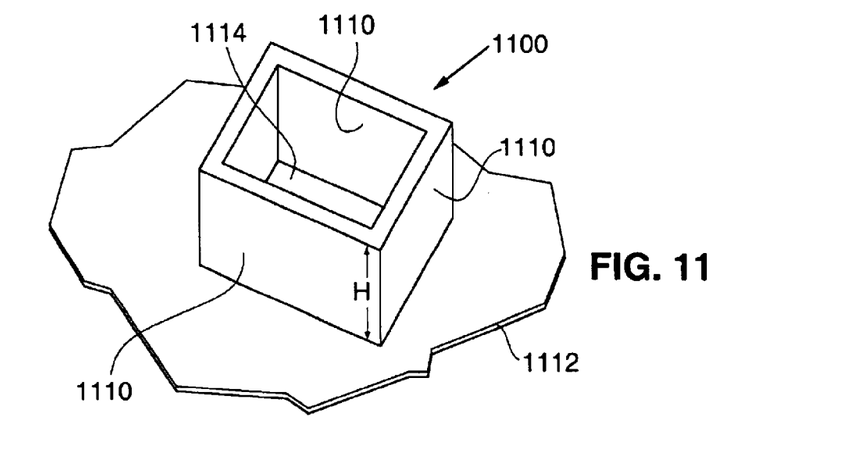
FIG. 11 is a perspective view illustrating a first retaining structure 1100 in accordance with the present invention.

Returning to FIG. 2, method 200 also includes step 214 where the transceivers are attached to the housings having the different housing styles. A number of different retaining structures can be used to attach the transceivers to the housings. FIG. 11 shows a perspective view that illustrates a first retaining structure 1100 in accordance with the present invention.

As shown in FIG. 11, first retaining structure 1100 includes a number of side walls 1110 that are connected to the inner side 1112 of a housing, such as inner side 612, 712, or 812. (Side walls 1110 need not be connected together as shown in FIG. 11.) Side walls 1110 have a height H such that when the housing is assembled, the side walls 1110 contact or nearly contact the opposing inner side of the housing. In the preferred embodiment of the present invention, side walls 1110 are integrally formed with the housings. (Partial in register side walls can optionally be formed on the inner sides of both halves of a housing.)

In this example, a transceiver is attached to the housing by inserting the transceiver into a region 1114 defined by side walls 1110. After this, the first and second halves of the housing, such as halves 610/614, 710/716, or 810/814, are connected together such that the inner sides of the housings along with side walls 1110 keep the transceiver in place.

Figure 12:
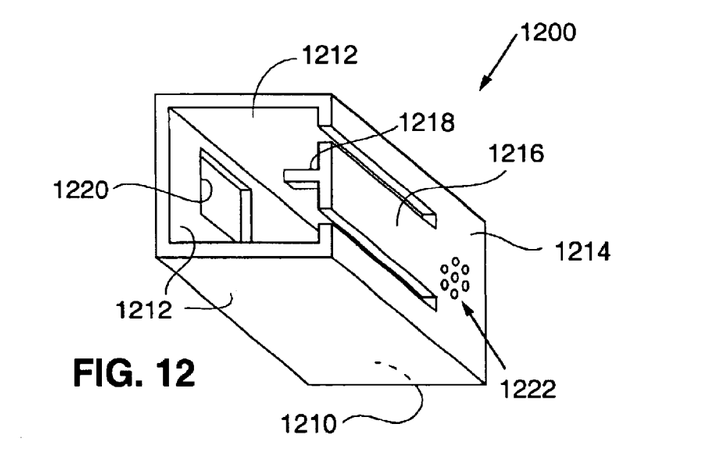
FIG. 12 is a perspective view illustrating a second retaining structure 1200 in accordance with the present invention.

FIG. 12 shows a perspective view that illustrates a second retaining structure 1200 in accordance with the present invention. As shown in FIG. 12, second retaining structure 1200 includes an end wall 1210, three side walls 1212 and a partial side wall 1214. Extending away from partial side wall 1214 in the same plane as partial side wall 1214 is a flexible member 1216 with a retaining clasp 1218. Further, a microphone opening 1220 and a number of speaker openings 1222 are formed in the side walls. In the preferred embodiment of the present invention, retaining structure 1200 is integrally formed with the housings such that at least one of the walls is in common with the inner side of a housing.

In this example, a transceiver is attached to the housing by pushing flexible member 1216 away from the opposing side wall, sliding the transceiver into retaining structure 1200, and then releasing flexible member 1216. When flexible member 1216 is released, it returns to its original position. In its original position, retaining clasp 1218 of flexible member 1216 retains the transceiver within structure 1200.

The advantage of retaining structure 1200 is that the transceivers can be easily inserted; either during the manufacturing process or by the user themselves. In addition, retaining structure 1200 gives the user the ability to switch a single transceiver among a number of housing styles. For example, a user may have a number of housing styles and a single transceiver. The user then has the ability to place the transceiver in the preferred housing, switch styles by switching housings whenever the mood occurs or buy new a housing.

Figure 13:
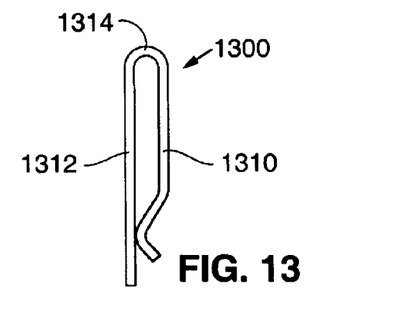
FIG. 13 is a side view illustrating a third retaining structure 1300 in accordance with the present invention.

FIG. 13 shows a side view that illustrates a third retaining structure 1300 in accordance with the present invention. As shown in FIG. 13, retaining structure 1300 is a clip with first and second legs 1310 and 1312 that are connected together via a U-shaped section 1314. Structure 1300, which utilizes a deformable material, is formed so that first leg 1310 contacts and exerts a force against second leg 1312.

In this example, a transceiver is attached to the housing by connecting retaining structure (clip) 1300 to a transceiver, such as transceiver 400 or 500. After this, legs 1310 and 1312 are spaced apart and the housing is inserted between legs 1310 and 1312. Once the housing has been inserted, the legs are released. The legs, in turn, try to return to their original position, thereby clamping the housing between the legs. Structure 1300 offers many of the same advantages as structure 1200 in that a user can switch the transceiver among a number of different housing styles.

Figure 14:
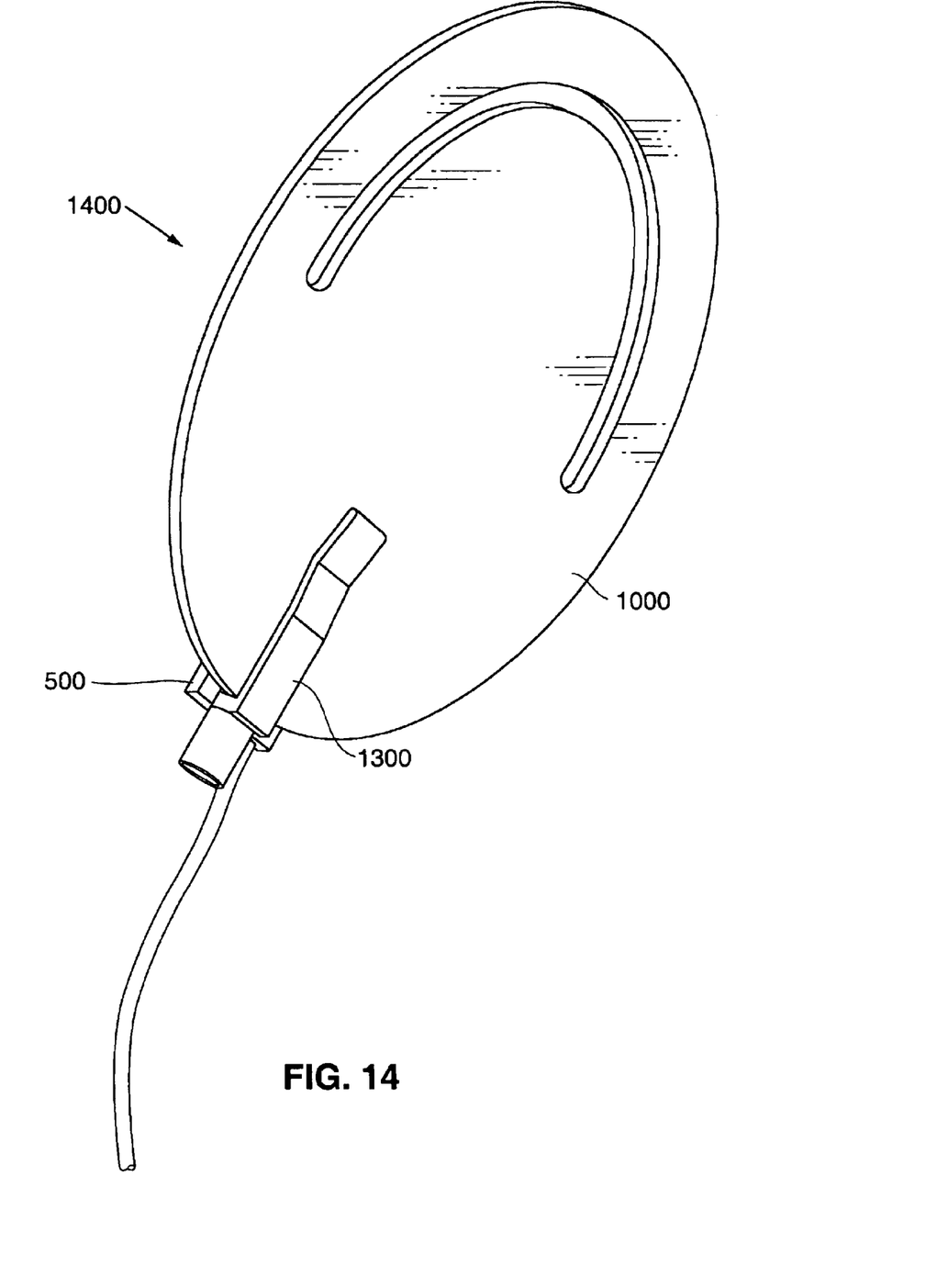
FIG. 14 is a perspective view of a headset 1400 illustrating the use of retaining structure (clip) 1300 in accordance with the present invention.

FIG. 14 shows a perspective view of a headset 1400 that illustrates the use of retaining structure (clip) 1300 in accordance with the present invention. As shown in FIG. 14, headset 1400 includes retaining structure 1300, transceiver 500 which is attached to structure 1300, and housing 1000 which is clamped by structure 1300.

Alternately, rather than using retaining structures 1100, 1200, or 1300, the transceivers can be permanently affixed to the housings. The transceivers can be permanently affixed using glue or other well-known adhesives. In addition, the clip can be part of the transceiver (or receiver if only a receiver is used), or part of the housing.

Thus, method 200 forms a plurality of housing styles with different shapes that each utilize the same transceiver form factor. By utilizing a single transceiver form-factor with a number of housing styles, development costs, manufacturing costs, and time to market are reduced while at the same time providing a wider variety of choices to the consumer.

In addition to providing the user with a wider variety of housing styles, the present invention also allows the end user to view the available styles, and order the desired style. As shown by dashed line 2A in FIG. 2, method 200 can include step 216 where a number of housings with different housing styles are displayed to a user population. The housing styles can be displayed to the user population, for example, by utilizing a web page, a catalog, or in a traditional retail setting. In addition, method 200 includes step 218 where orders are received from the users.

The orders, in turn, identify the housing styles (and quantity) selected by the users. The orders can be received, for example, by using an interactive web page, a paper form, or in person at a retail store. Once the order is received, delivery is arranged. In a retail setting, stock on hand is sold.

In accordance with the present invention, rather than displaying the housings to the user population after the headsets have been assembled, some of the manufacturing steps can be delayed until after orders are received for the headsets.

Figure 15:
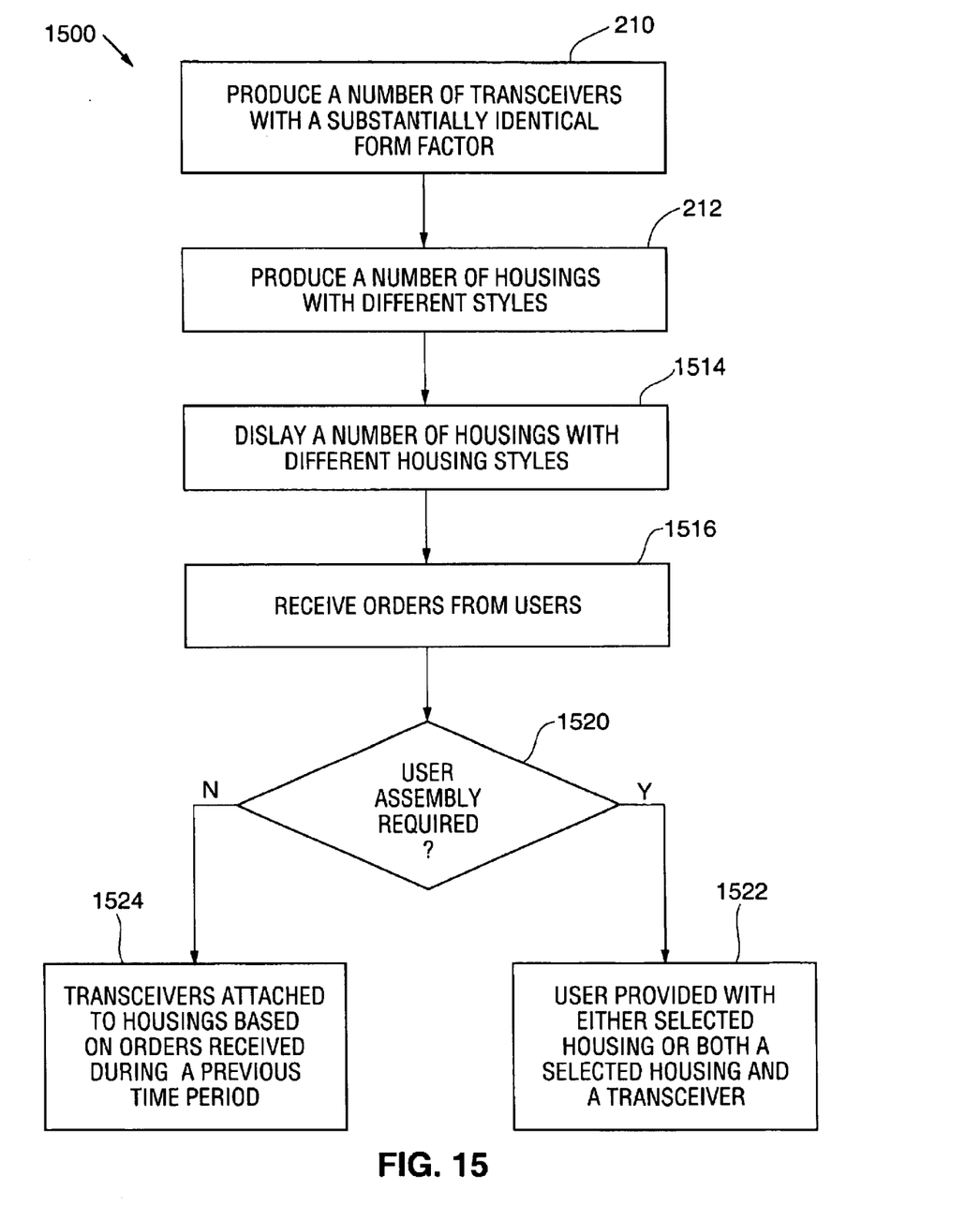
FIG. 15 is a flow chart illustrating a method 1500 for manufacturing headsets in accordance with the present invention.

FIG. 15 shows a flow chart that illustrates a method 1500 for manufacturing headsets in accordance with the present invention. Method 1500 is similar to method 200 and, as a result, utilizes the same reference numerals to designate the steps that are common to both methods.

As shown in FIG. 15, method 1500 is the same as method 200 up through step 212 (the formation of the housing styles), and diverges from method 200 at the next step, step 1514, where the number of housing styles are displayed to a user population. As in method 200, the housing styles can be displayed to the user population by utilizing a web page, a catalog, or a retail setting. In addition, method 1500 includes step 1516 where orders are received from the users. The orders, in turn, identify the housing styles (and quantity) selected by the users. The orders can be received, for example, by using an interactive web page, a paper form, or in person at a retail shop.

Next, method 1500 moves to step 1520 where method 1500 determines if assembly is to be performed by the user. If assembly is to be performed by the user, method 1500 moves to step 1522 where the user is provided with either a selected housing (if only a housing was purchased) or both a selected housing and a transceiver (if both a housing and a transceiver were purchased). If the user receives both the selected housing and a transceiver, the user assembles the headset by attaching the transceiver to the housing.

If assembly is not to be performed by the user, method 1500 moves to step 1524 where transceivers are attached to the housings based on the orders received during a previous time period. For example, every two weeks transceivers could be attached to the ordered housings to form completed headsets to satisfy the orders received during the previous two weeks. By attaching transceivers on an as-ordered basis, the costs to assemble the headsets can be more related to the headsets that are being sold. By allowing the user to finish the final assembly, the costs to assemble the headsets can be largely eliminated.

In addition to selecting a housing style, the user can also select or provide an example of an ornamentation to be formed on the selected housing. The ornamentation can include, for example, a logo, a trademark, a picture, or any design. Alternately, self-printable labels can be included with each housing sold so that the user can design their own ornamentation. Payment for the order can be received either prior to accepting the order, or following shipment of the order.

In addition, sample headsets can be displayed to the user population with some or none of the headset components being manufactured until some time after orders for the headsets have been received. For example, every two weeks headsets could be manufactured to satisfy the orders received during the previous two weeks.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A method for manufacturing headsets, the method comprising the steps of:

forming a plurality of substantially identical bodies, each body having a speaker transducer that outputs sound in response to a sound signal and a microphone transducer that outputs a speech signal in response to sound;

forming a number of types of housings, each housing including at least two housing parts that when assembled together define an inner cavity configured to receive a body and with each type of assembled housing having a different outer shape; and during assembly, mounting individual bodies within the cavities of different types of housings to create assembled headsets with different outer shapes.

2. The method of claim 1 wherein the body further includes a signal processing circuit connected to the speaker transducer.

3. The method of claim 2 wherein the body further includes a wireless reception circuit connected to the signal processing circuit.

4. The method of claim 1 wherein the body further includes a wireless reception circuit connected to the speaker transducer.

5. The method of claim 2 wherein the body further includes a wireless transmission and reception circuit connected to the signal processing circuit.

6. The method of claim 1 wherein the body further includes a wireless transmission and reception circuit connected to the speaker and microphone transducers.

7. The method of claim 1 wherein the body has a shape selected from the group consisting of an elongated shape, a circular shape, a flat laminated shape, and a square shape.

8. The method of claim 1 wherein the step of forming a plurality of housings includes the step of forming a retaining structure inside each housing, and the step of mounting includes the step of inserting a body into the retaining structure.

9. The method of claim 8 wherein the retaining structure includes a number of side walls that extend away from an inner side of the housing, and wherein the step of inserting includes the step of placing the body into a region defined by the number of side walls.

10. The method of claim 8 wherein the retaining structure includes a number of side walls, a partial side wall connected to the number of side walls, a flexible member that extends away from the partial side wall in a plane of the partial side wall, and a retaining clasp connected to the flexible member, and wherein the step of mounting includes the step of sliding the body into a region defined by the number of side walls and the partial side wall.

11. The method of claim 1 wherein each housing has a retaining structure.

12. The method of claim 1 wherein the housings have first and second sides, and a body is mounted to a housing by affixing the body to the first side of a housing, and connecting the first and second sides of the housing together.

13. The method of claim 1 and further comprising the steps of:

displaying the different housing shapes to a user population; and receiving an order from a user, the order identifying housing shape selected by the user.

14. The method of claim 13 wherein the different housing shapes are displayed to the user population on a web page.

15. The method of claim 13 wherein the order further includes an example of an ornamentation to be applied on the housing selected by the user.

16. The method of claim 15 wherein the ornamentation includes trademarks, logos, pictures, and designs.

17. The method of claim 13 wherein a housing is provided to the user in response to the order, and the housing includes self-printing labels.

18. A collection of headsets comprising:

a number of first housings, each first housing including at least two housing parts that when assembled together define an inner cavity;

a number of second housings, each second housing including at least two housing parts that when assembled together define an inner cavity, with the outer shape of the assembled first housings being different from the outer shape of the assembled second housings; and a number of substantially identical bodies, with a body being positioned within the inner cavity of each first housing and the inner cavity of each second housing, each body having a speaker transducer that outputs sound in response to a sound signal and a microphone transducer that outputs a speech signal in response to sound.

19. The headsets of claim 18 wherein the body further includes a signal processing circuit connected to the speaker transducer.

20. The headsets of claim 19 wherein the body further includes a wireless reception circuit connected to the signal processing circuit.

21. The headsets of claim 18 wherein the body further includes a wireless reception circuit connected to the speaker transducer.

22. The headsets of claim 18 wherein the inner cavity of each first housing is bounded by a flexible member with a retaining clasp that retains the body in the inner cavity.

23. The headsets of claim 18 wherein the body further includes a signal processing circuit connected to the speaker and microphone transducers.

24. The headsets of claim 23 wherein the body further includes a wireless transmission and reception circuit connected to the signal processing circuit.

* * * * *